(12) United States Patent
Kumar et al.

(10) Patent No.: US 12,301,422 B2
(45) Date of Patent: May 13, 2025

(54) SYSTEM AND METHOD FOR AI POLICY-BASED AUTO ASSURANCE

(71) Applicant: Rakuten Symphony, Inc., Tokyo (JP)

(72) Inventors: Vijay Kumar, Indore (IN); Hari Sridasyam, Indore (IN); Sayan Sarkar, Indore (IN); Sandeep Karkala, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/247,078

(22) PCT Filed: Dec. 13, 2022

(86) PCT No.: PCT/US2022/052699
§ 371 (c)(1),
(2) Date: Mar. 29, 2023

(87) PCT Pub. No.: WO2024/129064
PCT Pub. Date: Jun. 20, 2024

(65) Prior Publication Data
US 2025/0080423 A1    Mar. 6, 2025

(51) Int. Cl.
G06F 15/173   (2006.01)
H04L 41/0894  (2022.01)
H04L 41/0895  (2022.01)
H04L 41/16    (2022.01)

(52) U.S. Cl.
CPC ...... *H04L 41/0894* (2022.05); *H04L 41/0895* (2022.05); *H04L 41/16* (2013.01)

(58) Field of Classification Search
CPC .. H04L 41/0894; H04L 41/0895; H04L 41/16
See application file for complete search history.

(56) References Cited

U.S. PATENT DOCUMENTS

2023/0224838 A1\*  7/2023  Zeng ............... H04L 41/0894
                                              370/350

\* cited by examiner

*Primary Examiner* — Joseph R Maniwang
(74) *Attorney, Agent, or Firm* — HAUPTMAN HAM, LLP

(57) ABSTRACT

A system, includes processing circuitry; and a memory connected to the processing circuitry, wherein the memory is configured to store executable instructions that, in response to being executed by the processing circuitry, facilitate performance of operations to receive, by a policy manager, one or more events from a databus; trigger, based on the one or more events, an existing assurance policy; trigger, based on the existing assurance policy, a prediction request to an artificial intelligence (AI)/(ML) machine learning application; receive, by the policy manager, a change recommendation from the AI/ML application; create, by the policy manager, a new assurance policy based on the change recommendation from the AI/ML application; and trigger, by the policy manager, a corrective action to be taken based on a triggering of the new assurance policy implementing the change recommendation.

20 Claims, 6 Drawing Sheets

SYSTEM AND METHOD FOR AI POLICY-BASED AUTO ASSURANCE

RELATED APPLICATIONS

The present application is a National Phase of International Application No. PCT/US2022/052699, filed Dec. 13, 2022.

TECHNICAL FIELD

This description relates to a system for AI recommended policy-based auto assurance and method of using the same.

BACKGROUND

Event-driven architecture (EDA) is a software architecture promoting the production, detection, consumption of, and reaction to events. An event is a change in state, or an annotated label based on an entity's log output in a system. For example, when a consumer purchases an online product, the product's state changes from "for sale" to "sold". A seller's system architecture treats this state change as an event whose occurrence is made known to other applications within the architecture.

What is produced, published, propagated, detected, or consumed is a message called the event notification, and not the event, which is the state change that triggered the message emission. Events occur and event messages are generated and propagated to report the event that occurred. Nevertheless, the term event is often used metonymically to denote the notification event message. The EDA is often designed atop message-driven architectures, where such a communication pattern includes one of the inputs to be text-based (e.g., the message) to differentiate how each communication is handled.

SUMMARY

In some embodiments, a system, includes processing circuitry; and a memory connected to the processing circuitry, wherein the memory is configured to store executable instructions that, in response to being executed by the processing circuitry, facilitate performance of operations to receive, by a policy manager, one or more events from a databus; trigger, based on the one or more events, an existing assurance policy; trigger, based on the existing assurance policy, a prediction request to an artificial intelligence (AI)/(ML) machine learning application; receive, by the policy manager, a change recommendation from the AI/ML application; create, by the policy manager, a new assurance policy based on the change recommendation from the AI/ML application; and trigger, by the policy manager, a corrective action to be taken based on a triggering of the new assurance policy implementing the change recommendation.

In some embodiments, a method executed by processing circuitry, includes receiving, by a policy manager, one or more events from a databus; triggering, based on the one or more events, an existing assurance policy; triggering, based on the existing assurance policy, a prediction request to an artificial intelligence (AI)/(ML) machine learning application; receiving, by the policy manager, a change recommendation from the AI/ML application; creating, by the policy manager, a new assurance policy based on the change recommendation from the AI/ML application; and triggering, by the policy manager, a corrective action to be taken based on a triggering of the new assurance policy implementing the change recommendation.

In some embodiments, a non-transitory tangible computer readable storage medium storing a computer program, wherein the computer program contains instructions that in response to being executed, cause processing circuitry to perform operations to receive, by a policy manager, one or more events from a databus; trigger, based on the one or more events, an existing assurance policy; trigger, based on the existing assurance policy, a prediction request to an artificial intelligence (AI)/(ML) machine learning application; receive, by the policy manager, a change recommendation from the AI/ML application; create, by the policy manager, a new assurance policy based on the change recommendation from the AI/ML application; and trigger, by the policy manager, a corrective action to be taken based on a triggering of the new assurance policy implementing the change recommendation.

BRIEF DESCRIPTION OF THE DRAWINGS

Aspects of the embodiments are best understood from the following detailed description read with the accompanying Figures. In accordance with the standard practice in the industry, various features are not drawn to scale. The dimensions of the various features are arbitrarily increased or reduced for clarity of discussion.

DETAILED DESCRIPTION

Figure 1:
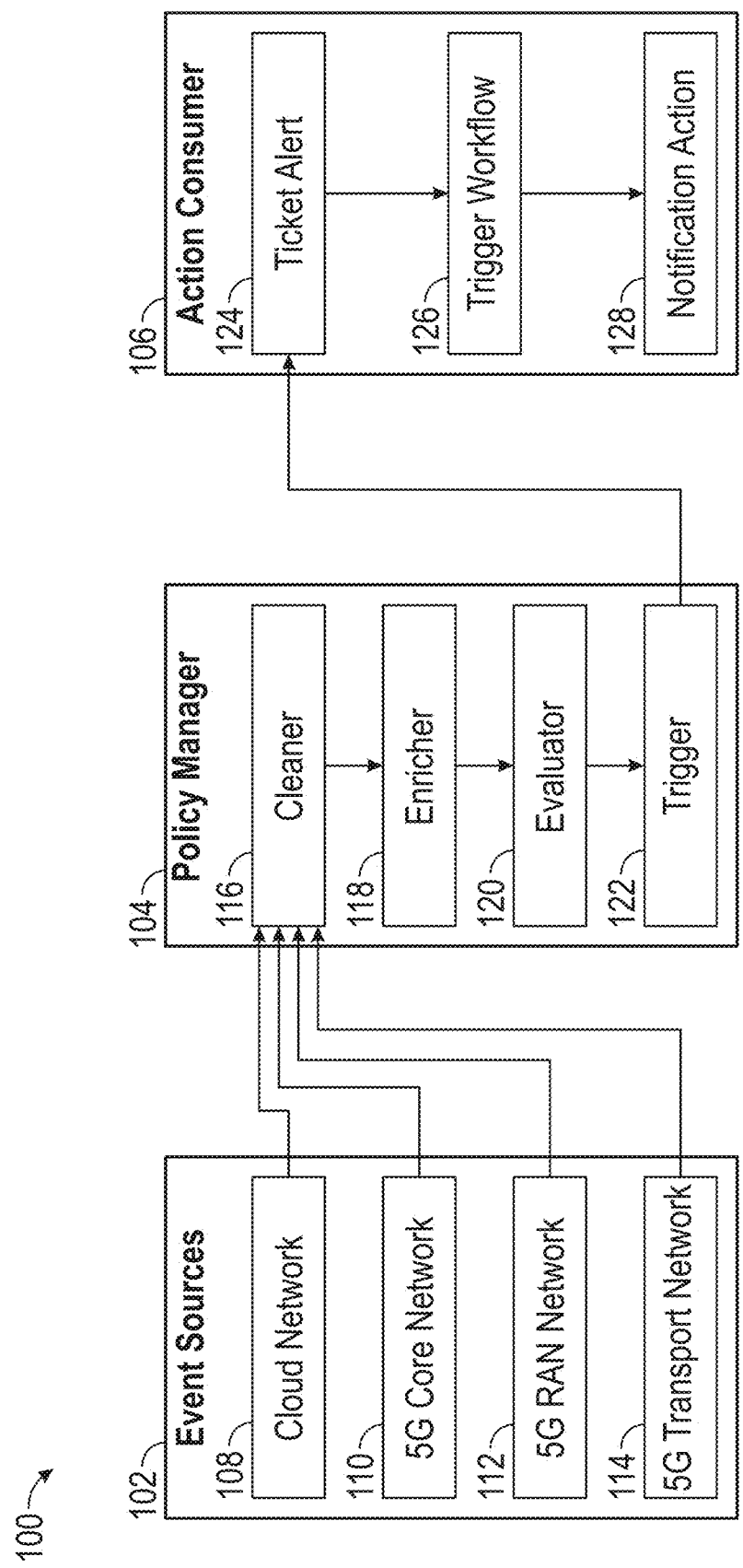
FIG. 1 is a block diagram of a correlation and policy engine (CPE), in accordance with some embodiments.

The following embodiments include many different examples, for implementing different features of the subject matter. Examples of components, values, operations, materials, arrangements, or the like, are described below to simplify the embodiments. These are, of course, examples and unintended to limit. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to contact directly. In addition, the embodiments repeat reference numerals and/or letters in the various examples. This repetition is for the purpose of simplicity and clarity and any indication of a relationship between the various embodiments and/or configurations discussed is unintended.

Further, spatially relative terms, such as "beneath," "below," "lower," "above," "upper" and the like, are usable herein for ease of description to describe one element or feature's relationship to another element or feature as illustrated in the Figures. The spatially relative terms are intended to encompass different orientations of the device in use or operation in addition to the orientation depicted in the Figures. One or more apparatus embodiments are otherwise oriented (rotated 90 degrees or at other orientations) and the spatially relative descriptors usable herein likewise are interpreted accordingly.

An EDA architectural pattern is applied by the design and implementation of applications and systems that transmit event messages among loosely coupled software components and services. An event-driven system typically consists of event emitters (agents, data sources), event consumers (sinks), and event channels (the medium the event messages travel from emitter to consumer). Event emitters detect, gather, and transfer event messages. An event emitter is unable to know the consumers of the event messages, the event emitter is unable to even know whether an event consumer exists, and in the event the consumer exists, the event emitter is unable to know how the event message is used or further processed. Event consumers apply a reaction as soon as an event message is presented. The reaction is or is not completely provided by the event consumer. For example, the event consumer filters the event message frame while the event policy executes and produces transformation and forwards the event message frame to another component or the event consumer supplies a self-contained reaction to such event message frame. Event channels are conduits in which event message frames are transmitted from event emitters to event consumers. In some embodiments, event consumers become event emitters after receiving event message frames and then forwarding the event message frames to other event consumers. The configuration of the correct distribution of event message frames is present within the event channel. The physical implementation of event channels is based on components, such as message-oriented middleware or point-to-point communication, which might rely on a more appropriate transactional executive framework (such as a configuration file that establishes the event channel).

A correlation and policy engine (CPE) is a software application that programmatically understands relationships. CPEs are configured to be used in system management tools to aggregate, normalize, and analyze event data. Event correlation is a technique for making sense of many events and pinpointing the few events that are important in a mass of information. This is accomplished by looking for and analyzing relationships between events. Further, a CPE is a program or process that receives machine-readable policies and applies them to a particular problem domain to constrain the behavior of network resources.

In programming and software design, an event is a change of state (e.g., an action or occurrence) recognized by software, often originating asynchronously from the external environment that is handled by the software. Computer event messages are generated or triggered by a system, by a user, or in other ways based upon the event. Event messages are handled synchronously with the program flow; that is, the software is configured to have one or more dedicated places (e.g., a data sink) where event messages are handled. A source of event messages includes the user, who interacts with the software through the computer's peripherals; for example, by typing on a keyboard. Another source is a hardware device such as a timer. Software is configured to further trigger the software's own set of event messages into the event channel (e.g., to communicate the completion of a task). Software that changes behavior in response to event messages is said to be event-driven, often with the goal of being interactive.

A policy manager is network assurance policy engine which triggers actions towards northbound systems based upon matching the condition defined for events received from southbound systems.

A policy manager determines the degree to which a service/device is allowed to do what the service/device is attempting/requesting (decision) and is then able to enforce the decision (enforcement). Some examples of policies include (1) is the customer allowed to use this service, (2) is there enough capacity to support this new service, (3) what happens to non-SLA (service level agreement) customers when a node approaches congestion, and (4) is the service request/activity a security threat?

A rule-based system is configured to be used to store and manipulate knowledge to interpret information in a useful way. Normally, the term rule-based system is applied to systems involving human-crafted or curated rule sets.

In software defined networking (SDN), southbound interfaces are the OpenFlow protocol specification that enables communication between controllers, switches, and other network nodes, which are with lower-level components. This further lets the router identify network topology, determine network flows, and implement requests sent to the router via northbound interfaces. Southbound application programming interfaces (APIs) allow the end-user to gain better control over the network and promotes the efficiency level of a SDN controller to evolve based on real-time demands. In addition, the SDN controller communicates with the forwarding plane to modify the networks that let the SDN controller to progressively move along with the advancing enterprise calls. To compose a more responsive network layer to real-time traffic demands, administrators add or remove entries to the internal flow-table of network switches and routers.

Contradictory to southbound APIs, northbound interfaces allow communication among the higher-level components. While traditional networks use a firewall or load balancer to control data plane behavior, SDN installs applications that use the controller, and these applications communicate with the controller through the northbound interface. The northbound API makes innovation or customization easier for network operators of the network controls and processing as this task doesn't require expertise, as the API is cleaned by a programmer who excels in programming languages. A northbound interface is an (API) or protocol that allows a lower-level network component to communicate with a higher-level or more central component, while a southbound interface allows a higher-level component to send commands to lower-level network components.

In some embodiments, an artificial intelligence (AI) recommended policy-based auto-assurance is discussed. AI is intelligence demonstrated by machines, as opposed to the natural intelligence displayed by animals and humans. AI refers to a system that perceives an environment and takes actions that maximize chances of achieving goals.

In other approaches, implementing network assurance is based on manual procedures. Network assurance has been based upon network key performance indicators (KPIs) and manual tuning was used to optimize network operations. However, the turnaround time for optimizing the network assurance operations remains high (e.g., from several minutes to days).

A performance indicator or KPI is a type of performance measurement. KPIs evaluate the success of an engaged in activity (such as projects, programs, products, and other initiatives). KPIs provide a focus for strategic and operational improvement, create an analytical basis for decision making, and help focus attention on what matters most.

In some embodiments, a policy manager consumes recommendations from AI/ML application in an on-demand basis as per situations (e.g., predicted) in the network via a unified, high-throughput, low-latency platform for handling real-time data feeds. In some embodiments, the AI/ML application suggests actions based on a learning model via data in terms of json (an open standard file format and data interchange format that uses human-readable text to store and transmit data objects consisting of attribute-value pairs and arrays (or other serializable values)) events which the policy manager consumes and triggers actions towards northbound systems. In some embodiments, the overall network assurance (day 2) operations is optimized with help of AI/ML recommendations streamed over the stream processing platform (e.g., the event channel) and consumed by the rule engine, such as the policy manager. Day 0 operations is design and procurement, day 1 operations are installing, provisioning, segmenting, and getting a network running, and day 2 operations is running the network.

In some embodiments, a KPI/SLA real-time prediction and physical resource block (PRB) management of enhanced mobile broadband (eMBB) for AI driven network assurance is discussed.

A SLA is a commitment between a service provider and a client. Aspects of the service include quality, availability, and responsibilities which are agreed on between the service provider and the service user. The most common component of an SLA is that services are provided to the customer as agreed upon in the contract. As an example, Internet service providers (ISPs) and telecommunications companies commonly include SLAs within the terms of their contracts with customers to define the level(s) of service being sold in plain language terms. In this case, the SLA typically includes a technical definition of mean time between failures (MTBF), mean time to repair or mean time to recovery (MTTR); identifying which party is responsible for reporting faults or paying fees; responsibility for various data rates; throughput; jitter; or similar measurable details.

In long term evolution (LTE is a standard for wireless broadband communication for mobile devices and data terminals, based on the GSM/EDGE and UMTS/HSPA standards), a PRB is described as consisting of 12 consecutive subcarriers for one slot (0.5 ms) and is the smallest element of resource allocation assigned by the eNodeB (eNB is the hardware that is connected to the mobile phone network that communicates directly wirelessly with mobile handsets (UEs), like a base transceiver station (BTS) in GSM networks) scheduler. EMBB uses 5G as a progression from 4G LTE mobile broadband services, with faster connections, higher throughput, and more capacity. This will benefit areas of higher traffic such as stadiums, cities, and concert venues.

In some embodiments, a cloud-native network function (CNF), network function (NF), and/or network service (NS) level's automatic scaling using an AI prediction is discussed.

A CNF is a software-implementation of a function, or application, traditionally performed on a physical device, but which runs inside containers. The characteristics of CNFs are containerized microservices that communicate with each-other via standardized RESTful APIs, small performance footprint, with the ability to scale horizontally, independence of guest operating system, since CNFs operate as containers, and lifecycle manageable by Kubernetes, using container images registries such as OCI Docker, and OS container runtime.

NFs include: (1) Access and Mobility Management Function (AMF) which supports the Termination of non-access stratum (NAS) signaling, NAS ciphering & integrity protection, registration management, connection management, mobility management, access authentication and authorization, and security context management. (2) Session Management Function (SMF) supports session management (session establishment, modification, release), user equipment (UE) IP address allocation & management, dynamic host configuration protocol (DHCP) functions, termination of NAS signaling related to session management, downlink (DL) data notification, traffic steering configuration for User plane function (UPF) for proper traffic routing. (3) UPF supports packet routing & forwarding, packet inspection, quality of service (QOS) handling, acts as an external protocol data unit (PDU) session point of interconnecting to Data Network (DN), and is an anchor point for intra- and inter-RAT (radio access technology) mobility. (4) Policy Control Function (PCF) supports a unified policy framework, providing policy rules to control plane (CP) functions, and access to subscription information for policy decisions in unified data repository (UDR). (5) Authentication Server Function (AUSF) acts as an authentication server. (6) Unified Data Management (UDM) supports the generation of Authentication and Key Agreement (AKA) credentials, user identification handling, access authorization, and subscription management. (7) Application Function (AF) supports application influence on traffic routing, accessing Network Exposure Function (NEF), and interaction with a policy framework for policy control. (8) NEF supports exposure of capabilities and events, secure provision of information from external applications to the 3GPP network, and translation of internal/external information. (9) NF Repository function (NRF) supports service discovery function, maintains NF profile and available NF instances. (10) Network Slice Selection Function (NSSF) supports selecting the Network Slice instances to serve the UE, determining the allowed NSSAI, and determining the AMF set to be used to serve the UE.

A NS is an application running at the network application layer and above, that provides data storage, manipulation, presentation, communication, or other capability which is often implemented using a client-server or peer-to-peer architecture based on application layer network protocols. Each service is usually provided by a server component running on one or more computers (often a dedicated server computer offering multiple services) and accessed via a network by client components running on other devices.

In some embodiments, automatic resource optimizing in multiple data centers (DC) with AI prediction is discussed.

A data center is a building, a dedicated space within a building, or a group of buildings used to house computer systems and associated components, such as telecommunications and storage systems. Since information technology (IT) operations are crucial for business continuity, redundant or backup components and infrastructure for power supply, data communication connections, environmental controls (e.g., air conditioning, fire suppression), and various security devices are included.

In some embodiments, where a KPI/SLA real-time prediction & PRB management of eMBB slice is implemented, virtualized distributed units (vDUs) push performance monitor (PM) metrics to an observability framework (OBF) application once a minute. VDUs run as virtual network functions (VNFs) within a network function virtualization (NFV) infrastructure. The OBF application collects telemetry data from NFs that enable the use of AI/ML to optimize and operate a 5G network. The OBF application provides visibility into a CNF's performance and operations in near-real time. This collected data is used to optimize networks through a closed loop automation module, which executes procedures to provide automatic scaling and healing while minimizing manual work and reducing errors.

In some embodiments, the OBF application performs decoding of the PM data received and publishes the PM data to a databus. A databus is a communication system that transfers data between components inside a computer, or between computers. This expression covers related hardware components (wire, optical fiber, and the like) and software, including communication protocols.

In some embodiments, the policy manager subscribes to the databus and any incoming events on the databus source (e.g., event source). In some embodiments, an active policy for threshold monitoring in a policy manager is triggered based on one or more incoming events. In some embodiments, based on the triggered policy, the policy manager computes the UE downlink throughput, expressed as equation (1).

$$UE(dlthpt/UE)=GDRB.UEthpVolD1.PCG/GDRB.UE1thpTime.PCG \qquad eq. (1)$$

Where dl is downlink and thpt is through put, GDRB is guaranteed, thp is throughput, Vol is volume, D1 is first datacenter and packet core gateway (PCB). Thus, guaranteed UE throughput volume packet core gateway (PCB). PCB is a cloud native user plane traffic processing and gateway function. Throughput refers to the rate of successful message delivery over a communication channel, such as Ethernet or packet radio, in a communication network. The data that these messages contain are delivered over physical or logical links, or through network nodes. Throughput is usually measured in bits per second (bit/s or bps), and sometimes in data packets per second (p/s or pps) or data packets per time slot. The system throughput or aggregate throughput is the sum of the data rates that are delivered to all terminals in a network. Throughput is essentially synonymous to digital bandwidth consumption; and is determined numerically by applying the queueing theory, where the load in packets per time unit is denoted as the arrival rate ($\lambda$), and the drop in packets per unit time is denoted as the departure rate ($\mu$). The throughput of a communication system is affected by various factors, including the limitations of the underlying analog physical medium, available processing power of the system components, end-user behavior, and the like.

Pertaining to cellular networks, the radio downlink is the transmission path from a cell site to the cell phone. Traffic and signaling flowing within the base station subsystem (BSS) and network switching subsystem (NSS) is further identified as uplink and downlink. Pertaining to computer networks, a downlink is a connection from data communications equipment towards data terminal equipment. This is also known as a downstream connection.

Equation 1 describes how the download throughput of a UE is equal to the UE throughput volume over time measured in bits/second. In some embodiments, UEs are a computer or computing system. Additionally, or alternatively, UEs have a liquid crystal display (LCD), light-emitting diode (LED) or organic light-emitting diode (OLED) screen interface providing a touchscreen interface with digital buttons and keyboard or physical buttons along with a physical keyboard. In some embodiments, UE's connect to the Internet and interconnects with other devices. Additionally, or alternatively, UE's incorporate integrated cameras, the ability to place and receive voice and video telephone calls, video games, and Global Positioning System (GPS) capabilities. Additionally, or alternatively, UEs run operating systems (OS) that allow third-party apps specialized for capabilities to be installed and run. In some embodiments, UEs are a computer (such as a tablet computer, netbook, digital media player, digital assistant, graphing calculator, handheld game console, handheld personal computer (PC), laptop, mobile Internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In some embodiments, the result of equation (1) is evaluated against the threshold value derived from enrichment of the slice manager and cloud management as a service (CMaaS) radio resource management (rRm) policy data.

In some embodiments, the slice manager is responsible for creating a network slice and NS subnet. RRm ensures efficient use of available network resources. A slice manager is described as a network orchestrator, which interfaces with the various functionalities performed by each layer to coherently manage each slice request. A slice manager enables efficient and flexible slice creation that is reconfigured during the slice's life cycle. Operationally, the slice manager is in charge of several tasks that provide a more effective coordination between the layers: such as end-to-end (E2E) service management which is the mapping of various service instances (e.g., NSs) expressed in terms of SLA requirements with suitable network functions capable of satisfying the service constraints, virtualization of physical network resources to simplify the resources management operations performed to allocate network functions, and slice life-cycle management to dynamically reconfigure each slice to accommodate possible SLA requirements modifications.

Threshold values include guaranteed throughput (gua Thpt), max throughput (maxThpt), rRMPolicyMaxRatio, rRMPolicyMinRatio, and rRMPolicydedicatedRatio, download throughput per UE dLThptPerUE low or dL ThptPerUE high.

The rRM policy includes guidance for split of radio resources between multiple slices the cell supports. The rRM policy ratio is used to specify a percentage of PRBs to the corresponding slice, in average over time. In some embodiments, the sum of the values is less or equal 100. Average time is implementation dependent.

In some embodiments, the policy manager triggers an AI/ML recommendation request. In some embodiments, the AI/ML application predicts a new threshold and streams the recommendation with a new PRB count onto the databus. In some embodiments, the AI/ML recommendation is consumed from the databus. In some embodiments, a new active policy, which is based on the AI/ML recommendation. In some embodiments, in response to the new active policy being triggered, the policy manager triggers the slice manager for a PRB configuration change.

In some embodiments, a CNF/NF/NS level automatic scaling using an AI prediction is discussed. In some embodiments, UPF N3 DL PM data is sent to the OBF application each minute. The 5G N3 interface performs the role of conveying user data from a radio access network (RAN) to the User Plane Function (UPF), making the creation of both low- and high-latency services possible.

In some embodiments, the OBF application performs enrichment of the UPF N3 DL throughput counter with the central inventory. The policy manager includes an enricher which enriches messages arriving with inventory information to successfully execute a policy. In some embodiments, the enricher is configured with a message-enrichment cache built by an enricher sync process. In a non-limiting example, received event data is missing fields or parameters. Events are then enriched with the help of an inventory to fill the missing fields and parameters, so decisions are made, and predetermined actions occur.

In some embodiments, the policy manager subscribes to the databus and incoming events. In some embodiments, an active policy for scaling in policy manager is triggered based on an incoming event. In some embodiments, the policy manager computes the slice utilization percentage and evaluates whether a threshold is breached. In a non-limiting example, a scale-in threshold is <=40% or a scale-out threshold is >=60%. In response to a threshold being breached, the policy manager triggers an AI/ML recommendation request. In some embodiments, the AI/ML application predicts a new threshold and streams a recommendation with new SCALEIN or SCALEOUT thresholds onto the databus. In some embodiments, the AI/ML recommendation is streamed from the databus and consumed by the policy manager. In some embodiments, a new active policy based one the AI/ML recommendation is created by the policy manager. In some embodiments, in response to the new active policy being triggered, the slice manager action is triggered for a UPF SCALEIN or SCALEOUT operation.

In some embodiments, automatic resource optimizing in multiple DCs with AI prediction is discussed. In some embodiments, a user request to optimize a slice is sent via a user interface (UI) to the slice manger. In some embodiments, the slice manager streams the request through the databus. In some embodiments, the policy manager consumes the request from slice manger via the databus to optimize the slice. In some embodiments, an active policy for optimizing a slice in the policy manager is triggered based on an incoming event. In some embodiments, based on the triggered policy, the policy manager triggers an AI/ML recommendation request. In some embodiments, the AI/ML application predicts a threshold and streams the recommendation with a MIGRATE UPF onto the databus. In some embodiments, the AI/ML recommendation is streamed by the databus and consumed by the policy manager. In some embodiments, a new active policy, based on the AI/ML recommendation, is crated in the policy manager. In some embodiments, in response to an incoming event triggering the new active policy, the policy manager triggers the slice manager to perform a UPF MIGRATE operation to a second DC.

FIG. 1 is a block diagram of a correlation and policy engine (CPE) 100, in accordance with some embodiments.

CPE 100 generally includes an event sources input block 102, policy manager block 104, and an action consumer block 106.

Event sources input block 102 includes event emitters (agents, data sources, and other suitable event emitters within the embodiments). Event emitters detect, gather, and transfer event messages. An event emitter is unable to know the consumers of the event messages, the event emitter is unable to even know whether an event consumer exists, and in the event the consumer exists, the event emitter is unable to know how the event message is used or further processed.

Event sources 102 include events from a cloud network 108. Cloud network computing is on-demand availability of computer system resources, especially data storage (e.g., cloud storage) and computing power, without direct active management by the user. Large clouds often have functions distributed over multiple locations, each location being a data center. Event sources from cloud network 108 are events occurring in the cloud network. In a non-limiting example, one or more incidents occurring within a DC (a building, a dedicated space within a building, or a group of buildings used to house computer systems and associated components, such as telecommunications and storage systems) of cloud network 108.

Event sources 102 include events from a 5G core network (CN) 110. A backbone or CN 110 is a part of a computer network which interconnects networks, providing a path for the exchange of information between different local area networks (LANs) or subnetworks. A CN ties together diverse networks in the same building, in different buildings in a campus environment, or over wide areas. A large corporation that has many locations has a CN that ties the locations together, for example, in response to a server cluster needing to be accessed by different departments of a company that are located at different geographical locations. The pieces of the network connections (for example: ethernet, wireless) that bring these departments together is often referred to as the CN. One example of a CN is the Internet backbone. Event sources from 5G CN 110 are events occurring in the 5G CN. In a non-limiting example, one or more incidents occurring within a server cluster (a set of servers that work together and viewed as a single system where each node is set to perform the same task, controlled, and scheduled by software) of 5G CN 110.

Event sources 102 include events from a 5G radio access network (RAN) 112. A RAN is part of a mobile telecommunication system. A RAN implements a radio access technology. RANs reside between a device such as a mobile phone, a computer, or remotely controlled machines and provides connection with a CN, such as CN 110. Depending on the standard, mobile phones and other wireless connected devices are varyingly known as UE, terminal equipment (TE), mobile station (MS), or the like. Examples of RAN types include global system for mobile communications (GSM) radio access network, GSM RAN (GRAN), GERAN (essentially the same as GRAN but specifying the inclusion of EDGE packet radio services), universal mobile telecommunications system (UMTS) RAN, UMTS terrestrial RAN (UTRAN), and E-UTRAN (e.g., long term evolution (LTE) high speed and low latency radio access network). Event sources from 5G RAN 112 are events occurring in the 5G RAN. In a non-limiting example, one or more incidents occurring within TE and or MS of 5G RAN 112.

Event sources 102 include events from 5G transport networks 114. 5G transport networks 114 include fronthaul and backhaul portions.

The backhaul portion of a network includes the intermediate links between the CN, such as CN 110, and small subnetworks at the edge of a network. The most common network type in which backhaul is implemented is a mobile network. A backhaul of a mobile network, also referred to as mobile-backhaul that connects a cell site to the CN. Two methods of mobile backhaul implementations are fiber-based backhaul and wireless point-to-point backhaul. In both the technical and commercial definitions, backhaul generally refers to the side of the network that communicates with the global Internet. Sometimes middle mile networks exist between the customer's own LAN and those exchanges. In some embodiments, this is a local wide area network (WAN) connection.

A fronthaul network is coincident with the backhaul network, but subtly different. In a cloud RAN (C-RAN) the backhaul data is decoded from the fronthaul network at centralized controllers, from where the backhaul data is then transferred to the CN. The fronthaul portion of a C-RAN includes the intermediate links between the centralized radio controllers and the radio heads (or masts) at the edge of a cellular network. Event sources from 5G transport networks 114 are events occurring in the 5G transport networks 114. In a non-limiting example, one or more incidents occurring within radio controllers or network switches of 5G transport networks 114.

Policy Manager 104 is a real-time complex event processing (CEP consists of a set of concepts and techniques for processing real-time events and extracting information from event streams as they arrive) engine at scale, which automates various workflows and network healing operations. CPE 100 processes events based on network assurance policies. Based upon pre-defined policies and rules policy manager 104 filters the events, enriches the events, correlates, and processes the events for action.

Policy manager 104 includes cleaner 116 that accepts the events from event sources block 102, removes unwanted events, and passes the filtered events to enricher 118 for further processing. In some embodiments, these filtered events are forwarded by using a message-policy cache built by a message-policy sync process. In computing, messages are passed between programs or between components of a single program. Message passing is a form of communication used in concurrent and parallel computing, object-oriented programming, and channel communication, where communication is made by sending messages to recipients. A message is sent to an object specifying a request for action.

Policy manager 104 includes enricher 118 which enriches the messages arriving from cleaner 116 with inventory information to successfully execute a policy.

In some embodiments, enricher 118 is configured with a message-enrichment cache built by an enricher sync process. In a non-limiting example, received event data is missing fields or parameters. Events are then enriched with the help of an inventory to fill the missing fields and parameters, so decisions are made, and predetermined actions occur.

Policy manager 104 includes evaluator 120 that evaluates and processes the enriched events arriving from enricher 118. Evaluator 120 is configured to identify root causes (e.g., what is causing or initiating the received events), decide relevant actions pursuant to predetermined network assurance policies, and inform action manager 120 accordingly.

Policy manager 104 includes trigger 122 that matches a network assurance policy with an event based on the output of evaluator 120 identifying the root causes of the received events. Trigger 122 then forwards the matched policy/event to action consumer 106 to begin an action workflow.

Action consumer 106 includes ticket alert 124. Ticket alert 124 creates an incident creation or a trigger to begin a workflow action.

Action consumer 106 includes trigger workflow 126. In some embodiments, trigger workflow 126 performs actions based on a user-created network assurance policy. In some embodiments, trigger workflow 126 initiates the sending of a notification. In some embodiments, trigger workflow 126 initiates a reboot, restart, scale in, scale out, or other suitable actions within embodiments.

Action consumer 106 includes a notification action 128. In some embodiments, notification action 128 is an email, text message or graphical user interface (GUI) display on a user interface, such as user interface 618 (FIG. 6) notifying the policy creator and/or network operator an event was received, diagnosed, an action taken, and the result of the action taken (e.g., the action taken was successful or failed).

Figure 2:
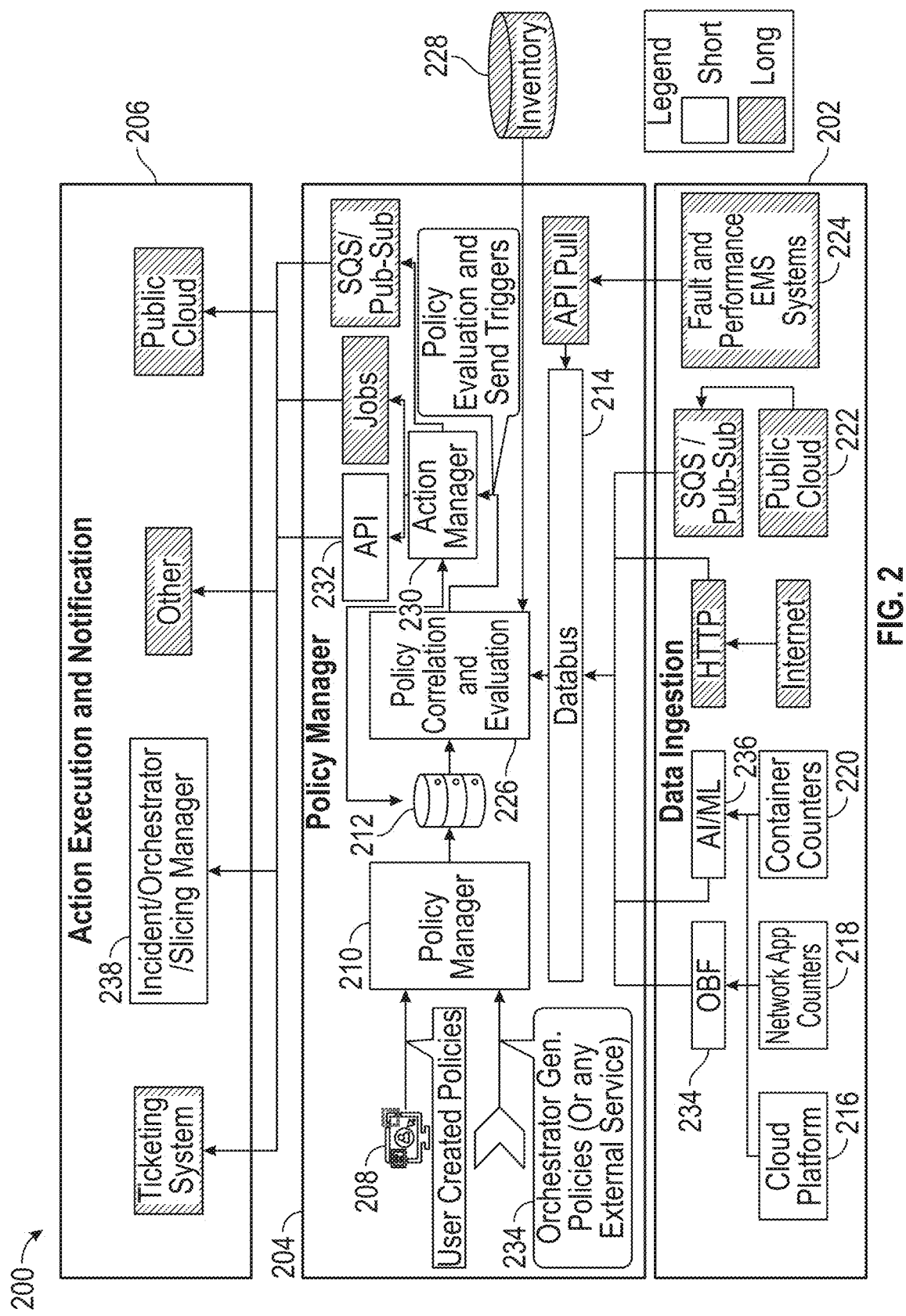
FIG. 2 is a diagrammatic representation a CPE, in accordance with some embodiments.

FIG. 2 is a diagrammatic representation a CPE 200, in accordance with some embodiments.

In some embodiments, CPE 200 is like CPE 100. In some embodiments, event sources 202 is like data ingestion block 102, policy manager 204 is like policy manager 104, and action consumer 206 is like action manager 106.

Policy Manager 204 is a real-time CEP engine at scale, which automates various workflows and network healing operations (e.g., repair and/or restoration). Policy manager 204 processes events based on predetermined network assurance policies and/or rules. Policy manager 204 filters the events, enriches the events, correlates, and processes the events for action. Policy manager 204 provides a framework to support CEP capabilities. In some embodiments, in memory computation logic mitigates latency issues. In some embodiments, multi-source events ingestion covers broader use cases in complex networks and infrastructure. In some embodiments, policy manager 204 is configured with scalable architecture based upon a business requirement (e.g., a new business policy being implemented). In some embodiments, policy manager 204 supports multiple computation logic in near-real time processing, such as event followed by, event AND, event OR, count of event occurrences, and mathematical operations on event counters. In a non-limiting example, the computation logic supports performing an action managed by action manager 230 in response to XYZ event, followed by ABC event, AND (UVW event OR DEF event) along with ten event GHI occurrences. In some embodiments, policy queries are applied on a potentially infinite stream of data. In some embodiments, events are processed immediately. In some embodiments, once policy manager 204 processes events for a matching sequence, results are driven directly. In some embodiments, this aspect effectively leads to policy manager 204 having a near real-time capability.

Figure 6:
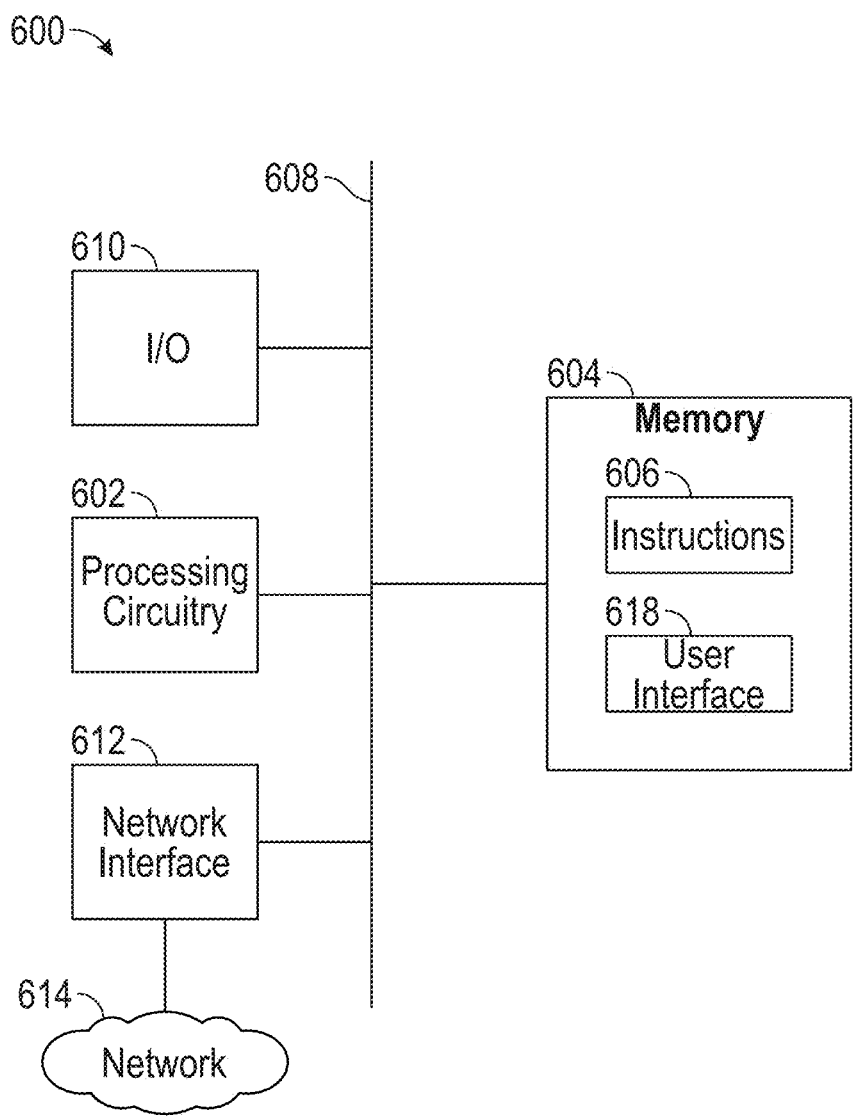
FIG. 6 is a high-level functional block diagram of a processor-based system, in accordance with some embodiments.

Users and/or network operators create policy templates using UI 208. In some embodiments, UI 208 is configured with GUIs that are configured to allow a user to view policy creation templates where the user enters information to create a policy. In some embodiments, UI 208 is like UI 618 (FIG. 6). In some embodiments, an orchestrator 234 (orchestration is the automated configuration, coordination, and management of computer systems and software) provides general policies, artificial intelligence (AI) generated policies or policies from any external service. The generated policies are sent to policy manager 210 and policy manager 210 relays the created policies to database 212.

The created policy templates are saved in database 212 as a draft. The policy templates are configured to be validated, activated, de-activated, edited, and deleted. Thus, templates are stored in database 212 until needed and then activated upon command by a user.

Databus 214 receives data from various sources from data ingestion block 202, such as cloud platform 216, network application counters 218, container application counters 220, other events through the Internet, events through a public cloud 222, and events through a fault and performance system 224. Included between databus 214 and cloud platform 216, network application counters 218, and container application counters 220 is OBF application 234 and AI/ML application 236.

The terms observability and monitoring are often used interchangeably but have different meanings. Observability refers to the ability to derive the (internal) state of a system based on external outputs. The goal is to externalize the system state based on sensor data outputs. Monitoring describes the discipline of collecting metrics and alerts to monitor the health and performance of discrete IT infrastructure components (e.g., servers, storage, and network devices). Observability creates actionable feedback loops using telemetry data and expands the scope of traditional monitoring by collecting different types of data. By aggregating and correlating data, observability is focused on deriving actionable system-level insights.

In some embodiments, where a KPI/SLA real-time prediction & PRB management of eMBB slices is implemented, virtualized distributed units (vDUs) push performance monitor (PM) metrics to OBF application 234 once a minute. VDUs run as virtual network functions (VNFs) within a network function virtualization (NFV) infrastructure. OBF 234 collects telemetry data from NFs that enable the use of AI/ML application 236 to optimize and operate a 5G network. OBF application 234 provides visibility into CNF's performance and operations in near-real time. This collected data is used to optimize the network through a closed loop automation module (not shown), which executes procedures to provide automatic UPF scaling and healing while minimizing manual work and reducing errors.

In some embodiments, OBF application 234 performs decoding of the PM data received and publishes the PM data to databus 214. In some embodiments, UPF N3 DL PM data is sent to OBF application 234 each minute. The 5G N3 interface performs the role of conveying user data from the RAN, such as RAN 112, to the User Plane Function (UPF), making the creation of both low- and high-latency services possible. In some embodiments, OBF application 234 performs enrichment of the UPF N3 DL throughput counter with central inventory 228.

In some embodiments, policy manager 204 consumes recommendations from AI/ML application 236 in an on-demand basis pursuant to situations (e.g., predicted) in a network, such as cloud network 108, 5G core network 110, 5G RAN network 112, or 5G transport network 114, via a unified, high-throughput, low-latency platform for handling real-time data feeds. In some embodiments, AI/ML application 236 suggests actions based on a learning model via data in terms of events which policy manager 204 consumes and triggers actions towards northbound systems. In some embodiments, the overall network assurance (day 2) operations are optimized with AI/ML recommendations streamed over the stream processing platform and consumed by the rule engine, such as policy manager 204.

In some embodiments, policy manager 204 triggers an AI/ML recommendation request. In some embodiments, AI/ML 236 predicts a new threshold and streams the recommendation with a new PRB count on to databus 214. In some embodiments, the AI/ML recommendation is consumed from databus 214. In some embodiments, an active policy, which is for the AI/ML recommendation slice manager action is triggered. In some embodiments, policy manager 204 triggers the slice manager for a PRB configuration change.

In some embodiments, policy manager 204 subscribes to incoming events on databus 214. In some embodiments, an active policy for scaling in policy manager 204 is triggered based on an incoming event. In some embodiments, policy manager 204 computes the slice utilization percentage and evaluates whether a current threshold is breached. Such as a scale-in threshold being ≤40% or a scale-out threshold being ≥60%. In response to a threshold being breached, policy manager 204 triggers an AI/ML recommendation request. In some embodiments, AI/ML application 236 predicts a new threshold and streams a recommendation with a new SCALEIN or SCALEOUT on to databus 214. In some embodiments, the AI/ML recommendation is streamed from databus 214 and consumed by policy manager 204. In some embodiments, a new active policy based on the AI/ML recommendation is created by policy manager 204. In some embodiments, in response to incoming events triggering the new active policy, policy manager 204 triggers the slice manager 238 for a UPF SCALEIN or SCALEOUT operation.

In some embodiments, automatic resource optimizing in multiple DCs with AI prediction is discussed. In some embodiments, a user request via a UI to optimize a slice is received at slice manager 238. In some embodiments, slice manager 238 streams the request through databus 214. In some embodiments, policy manager 204 consumes the request from slice manager 238 via databus 214 to optimize a slice. In some embodiments, an active policy for optimizing a slice is triggered in policy manager 204. In some embodiments, in response to the active policy being triggered by incoming events, policy manager 204 triggers the AI/ML recommendation request. In some embodiments, AI/ML application 236 predicts a new threshold and streams the recommendation with MIGRATE UPF onto databus 214. In some embodiments, the AI/ML recommendation is streamed by databus 214 and consumed by policy manager 204. In some embodiments, a new active policy based on the AI/ML recommendation is created in policy manager 204. In some embodiments, in response to the new active policy being triggered by incoming events, policy manager 204 triggers slice manager 238 for an UPF MIGRATE operation to a second datacenter.

In response to received event data at databus 214 missing fields and/or parameters, these events with missing fields and/or parameters are enriched at policy correlation and evaluation (PCE) module 226 through inventory 228 that provides the missing fields and/or parameters, to make decisions and take predetermined actions. In some embodiments, this is referred to as inventory enrichment.

PCE module 226 logically evaluates and processes the events from databus 214 based on policies from policy manager 210. PCE 226 is configured to identify root causes of events, determine relevant actions pursuant to the predetermined policies, and inform action manager 230 accordingly of any relevant actions pursuant to the predetermined policies.

Action manager 230 accepts the results after event processing by PCE 226 and takes the corresponding action related to that result. In a non-limiting example, action manager 230 sends an email, sends a request to an API endpoint 232, or other suitable action within embodiments. Action Manager 230 obtains the status of the executed action and updates the database 212 so that users visualize a job status in UI 208.

Figure 3:
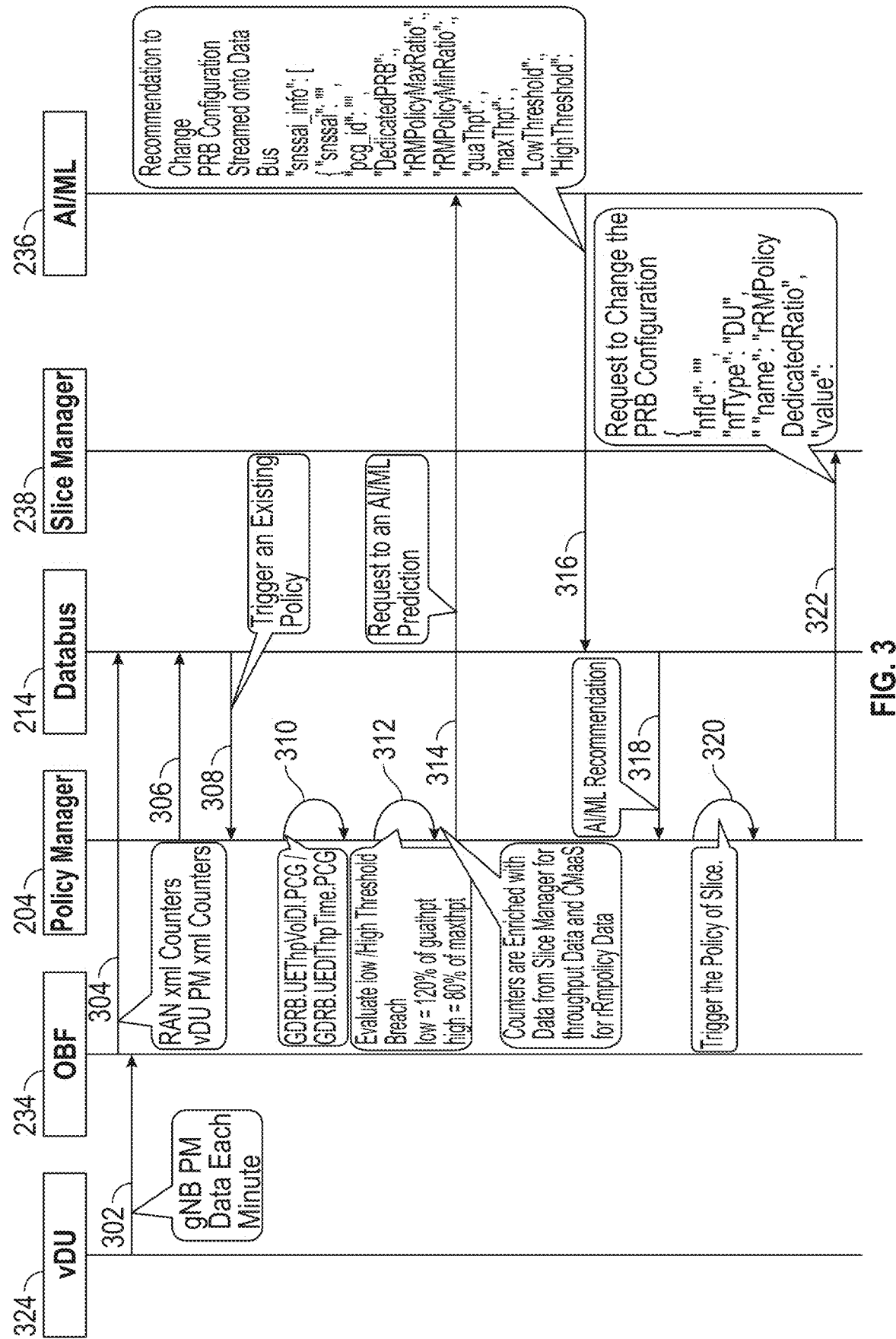
FIG. 3 is a data flow diagram of a method for physical resource block (PRB) management, in accordance with some embodiments.

FIG. 3 is a data flow diagram of a method for physical resource block (PRB) management 300, in accordance with some embodiments.

FIG. 3 is discussed to provide an understanding of the operation of CPEs 100 and 200 through method for PRB management 300. In some embodiments, method for PRB management 300 is a functional overview of a CPE, such as CPEs 100 and/or 200. In some embodiments, method for PRB management 300 is executed by processing circuitry 602 discussed below with respect to FIG. 6. In some embodiments, some, or all the operations of method for PRB management 300 are executed in accordance with instructions corresponding to instructions 606 discussed below with respect to FIG. 6.

Method for PRB management 300 includes operations 302-322, but the operations are not necessarily performed in the order shown. Operations are added, replaced, order changed, and/or eliminated as appropriate, in accordance with the spirit and scope of the embodiments. In some embodiments, one or more of the operations of method for PRB management 300 are repeated. In some embodiments, unless specifically stated otherwise, the operations of method for PRB management 300 are performed in order.

In some embodiments, policy manager 204 analyzes, computes, enriches, and evaluates the collected events. In some embodiments, a user creates policy templates through a user interface (UI), such as UI 208 or UI 618. The created policy filters the collected events, enriches the events (e.g., adds any related event data), correlates the enriched event and then processes the enriched event for action.

A user interface (UI), such as UI 208 or UI 618, is the space where interactions between humans and machines occur. The goal of this interaction is to allow effective operation and control of the machine from the human end, while the machine simultaneously feeds back information that aids the operators' decision-making process. Non-limiting examples of UIs include the interactive aspects of computer operating systems, hand tools, heavy machinery operator controls, and process controls. UIs are composed of one or more layers, including a human-machine interface (HMI) that interfaces machines with physical input hardware such as keyboards, mice, or game pads, and output hardware such as computer monitors, speakers, and printers. A device that implements an HMI is called a human interface device (HID). Other terms for human-machine interfaces are man-machine interface (MMI) and, when the machine in question is a computer, human-computer interface. Additional UI layers may interact with one or more human senses, including: tactile UI (touch), visual UI (sight), auditory UI (sound), olfactory UI (smell), equilibria UI (balance), and gustatory UI (taste).

An action is triggered based upon a matched policy. In some embodiments, a CPE core, such as processing circuitry 602 of FIG. 6, logically evaluates and processes the collected events. In some embodiments, the CPE core identifies root causes, decides relevant actions pursuant to predetermined policies and instructs an action manager, such as action manager 230, according to the predetermined network assurance policies. In some embodiments, action manager 230 collects the results of event processing and takes a respective action related to the collected result. In a non-limiting example, action manager 230 sends an email, sends a request to an application programming interface (API) endpoint, and other suitable actions within the embodiments. In some embodiments, action manager 230 obtains job status feedback to determine the status of the executed job and update a backend application at the database, so that users determine a status of the job through a UI.

In operation 302 of method for PRB management 300, one or more vDUs 324 push PM metrics to OBF 234 each minute. In some embodiments, vDUs 324 are gNodeBs (gNBs) pushing PM data each minute. GNodeB is a 3GPP-compliant implementation of the 5G-NR (new radio) base station. GNodeB consists of independent NFs which implement 3GPP-compliant NR RAN protocols.

Push technology or server push is a style of Internet-based communication where the request for a given transaction is initiated by the publisher or central server. Push is contrasted with pull/get, where the request for the transmission of information is initiated by the receiver or client. Push services are often based on information preferences expressed in advance (e.g., a subscription). Push is called a publish/subscribe model. A client "subscribes" to various information "channels" provided by a server and whenever new content is available on one of those channels, the server pushes that information out to the client. Process flows from operation 302 to operation 304.

In operation 304 of method for PRB management 300, OBF application 234 performs decoding of the PM data received each minute and publishes the decoded PM data to databus 214. Process flows from operation 304 to operation 306.

In operation 306 of method for PRB management 300, policy manager 204 subscribes to databus 214 and incoming events on the event source. Process flows from operation 306 to operation 308.

In operation 308 of method for PRB management 300, an existing active policy for UE throughput threshold monitoring in policy manager 204 is triggered based on one or more incoming events. Process flows from operation 308 to operation 310.

In operation 310 of method for PRB management 300, policy manager 204 determines the downlink throughput per UE. As discussed above, the downlink throughput per UE is determined by dividing the guaranteed UE downlink throughput volume by the guaranteed UE downlink throughput time (e.g., dL ThptPerUE=GDRB.UEThpVolDL.PCG/GDRB.UEDLThpTime). In some embodiments, the guaranteed UE downlink throughput volume and the guaranteed UE downlink throughput time are determined by an SLA. In some embodiments, the SLA that establishes the guaranteed UE downlink throughput volume and the guaranteed UE downlink throughput time is incorporated into a rule-based policy of which policy manager 204 acts on based upon events streaming from databus 214. Process flows from operation 310 to operation 312.

In operation 312 of method for PRB management 300, policy manager 204 determines one or more UE dl throughput thresholds derived from enrichment of incoming events from slice manager 238 and CMaaS rRmpolicy data. In some embodiments, thresholds include guaranteed throughput, max throughput, rRM policy max ratio, rRM policy minimum ratio, rRM policy dedicated ratio, a low UE downlink throughput, and a high UE downlink throughput. In a non-limiting example, a low UE downlink throughput threshold is equal to 120% of the guaranteed throughput. In this manner, the provider ensures that the network is operating at 120% of the throughput promised to subscribers of the network. In another non-limiting example, a high UE downlink throughput is equal to 80% of the max throughput. In this manner, the provider is alerted when the UE downlink capacity is at 80% of the maximum and the provider is able to take action to ensure greater resources are available before the UE downlink capacity exceeds the maximum. In some embodiments, network application counters 218 and container counters 220 are enriched with data from slice manager 238 for throughput data and CMaaS for rRM policy data. Process flows from operation 312 to operation 314.

In operation 314 of method for PRB management 300, policy manager 204 triggers an AI/ML recommendation request. Process flows from operation 314 to operation 316.

In operation 316 of method for PRB management 300, AI/ML 236 predicts new throughput thresholds and streams the recommendation with a new PRB count to databus 214. Process flows from operation 316 to operation 318.

In operation 318 of method for PRB management 300, the AI/ML recommendation is consumed by policy manager 204 from databus 214. Process flows from operation 318 to operation 320.

In operation 320 of method for PRB management 300, a new active policy, based on the AI/ML recommendation, is created by policy manager 204. Process flows from operation 320 to operation 322.

In operation 322 of method for PRB management 300, policy manager 204, based on the triggering of the new active policy, triggers slice manager 238 for a PRB configuration change.

Figure 4:
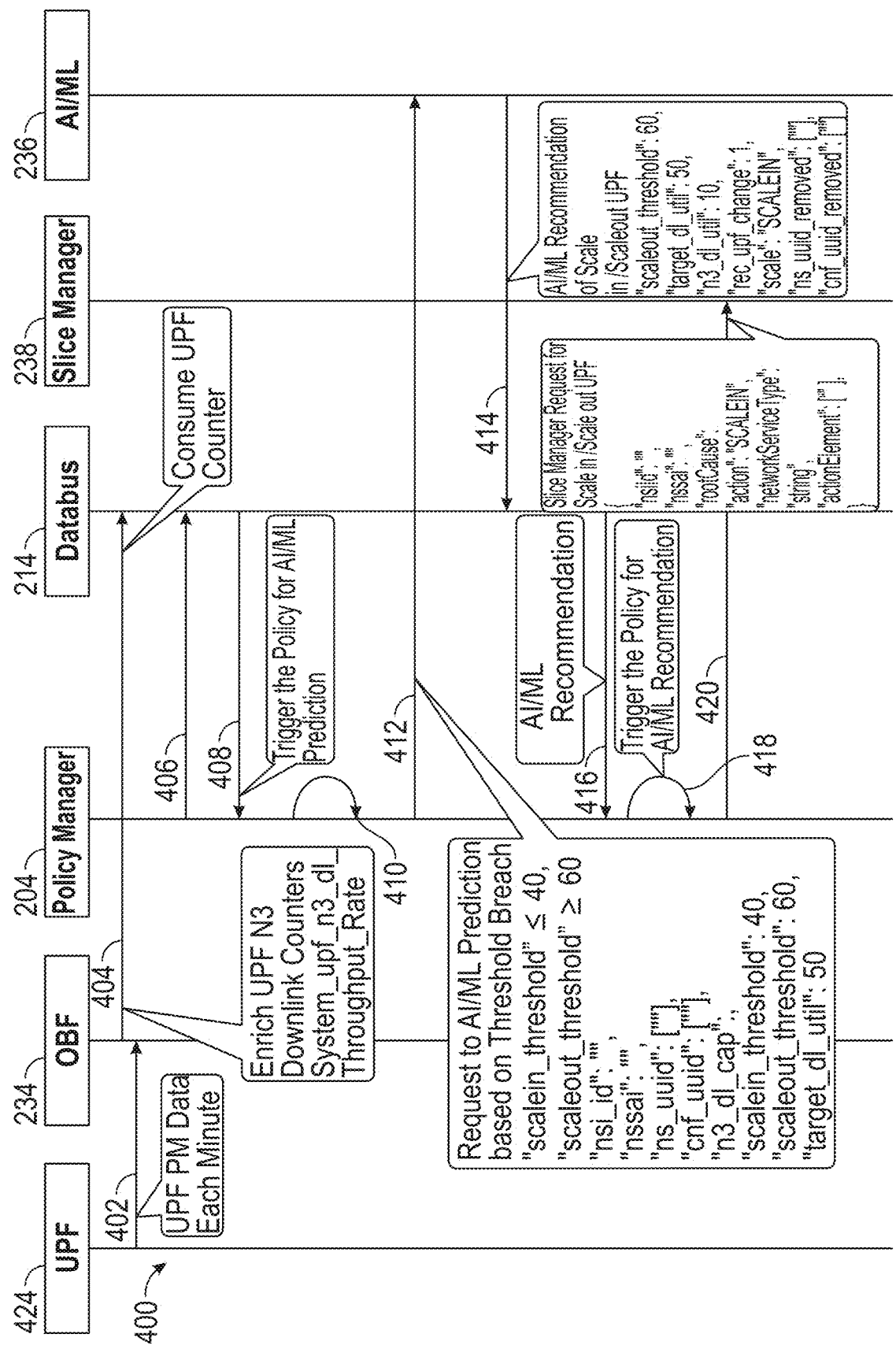
FIG. 4 is a data flow diagram of a method for automatic level scaling, in accordance with some embodiments.

FIG. 4 is a data flow diagram of a method for automatic level scaling 400, in accordance with some embodiments.

FIG. 4 is discussed to provide an understanding of the operation of CPEs 100 and 200 through method for automatic level scaling 400. In some embodiments, method for automatic level scaling 400 is a functional overview of a CPE, such as CPEs 100 and/or 200. In some embodiments, method for automatic level scaling 400 is executed by processing circuitry 602 discussed below with respect to FIG. 6. In some embodiments, some, or all the operations of method for automatic level scaling 400 are executed in accordance with instructions corresponding to instructions 606 discussed below with respect to FIG. 6.

Method for automatic level scaling 400 includes operations 402-420, but the operations are not necessarily performed in the order shown. Operations are added, replaced, order changed, and/or eliminated as appropriate, in accordance with the spirit and scope of the embodiments. In some embodiments, one or more of the operations of method for automatic level scaling 400 are repeated. In some embodiments, unless specifically stated otherwise, the operations of method for automatic level scaling 400 are performed in order.

At operation 402 of method for automatic level scaling 400, UPF 424 N3 DL PM data is sent to OBF 234 each minute. Process flows from operation 402 to operation 404.

At operation 404 of method for automatic level scaling 400, OBF application 234 performs enrichment of the UPF N3 downlink throughput counter data with data from central inventory 228 and sends the enriched UPF N3 downlink throughput counter data to databus 214. Process flows from operation 404 to operation 406.

At operation 406 of method for automatic level scaling 400, policy manager 204 subscribes to incoming events on databus 214. Process flows from operation 406 to operation 408.

At operation 408 of method for automatic level scaling 400, an existing active policy for scaling is triggered in policy manager 204 based on one or more incoming events. Process flows from operation 408 to 410.

At operation 410 of method for automatic level scaling 400, policy manager 204 determines the slice utilization percentage. In some embodiments, the slice utilization percentage is a quantifier for the efficiency of slice manager 238 in packing network slices. Process flows from operation 410 to operation 412.

At operation 412 of method for automatic level scaling 400, policy manager 204 determines whether the slice utilization percentage exceeds the scale-in ($\leq 40\%$) or scale-out ($\geq 60\%$) thresholds and in response to exceeding the scale-in ($\leq 40\%$) or scale-out ($\geq 60\%$) thresholds, an AI/ML recommendation request is triggered.

In the 5G core and the upcoming 6G core, the UPF (a virtual machine or container implemented as a UPF instance in a cluster) is responsible for sending data to and receiving data from subscribers in PDU sessions. To save resource consumption for UPF instances, the number of initiated UPF instances depends on the number of PDU sessions, which is often controlled by a scaling algorithm. In some embodiments, AI/ML application 236 makes a recommendation for scaling UPF instances that are packed in containers based on the scale-in and scale-out thresholds.

At operation 414 of method for automatic level scaling 400, AI/ML application 236 predicts a new threshold and streams a recommendation with new SCALEIN or SCALEOUT thresholds on to databus 214. Process flows from operation 414 to operation 416.

At operation 416 of method for automatic level scaling 400, the AI/ML recommendation is consumed from databus 214 by policy manager 204. Process flows from operation 416 to operation 418.

At operation 418 of method for automatic level scaling 400, a new active policy, based on the AI/ML recommendation, is created. Process flows from operation 418 to operation 420.

At operation 420 of method for automatic level scaling 400, in response to a triggering event of the new active policy, policy manager 204 triggers slice manager 238 for a UPF SCALEIN or SCALEOUT operation.

Figure 5:
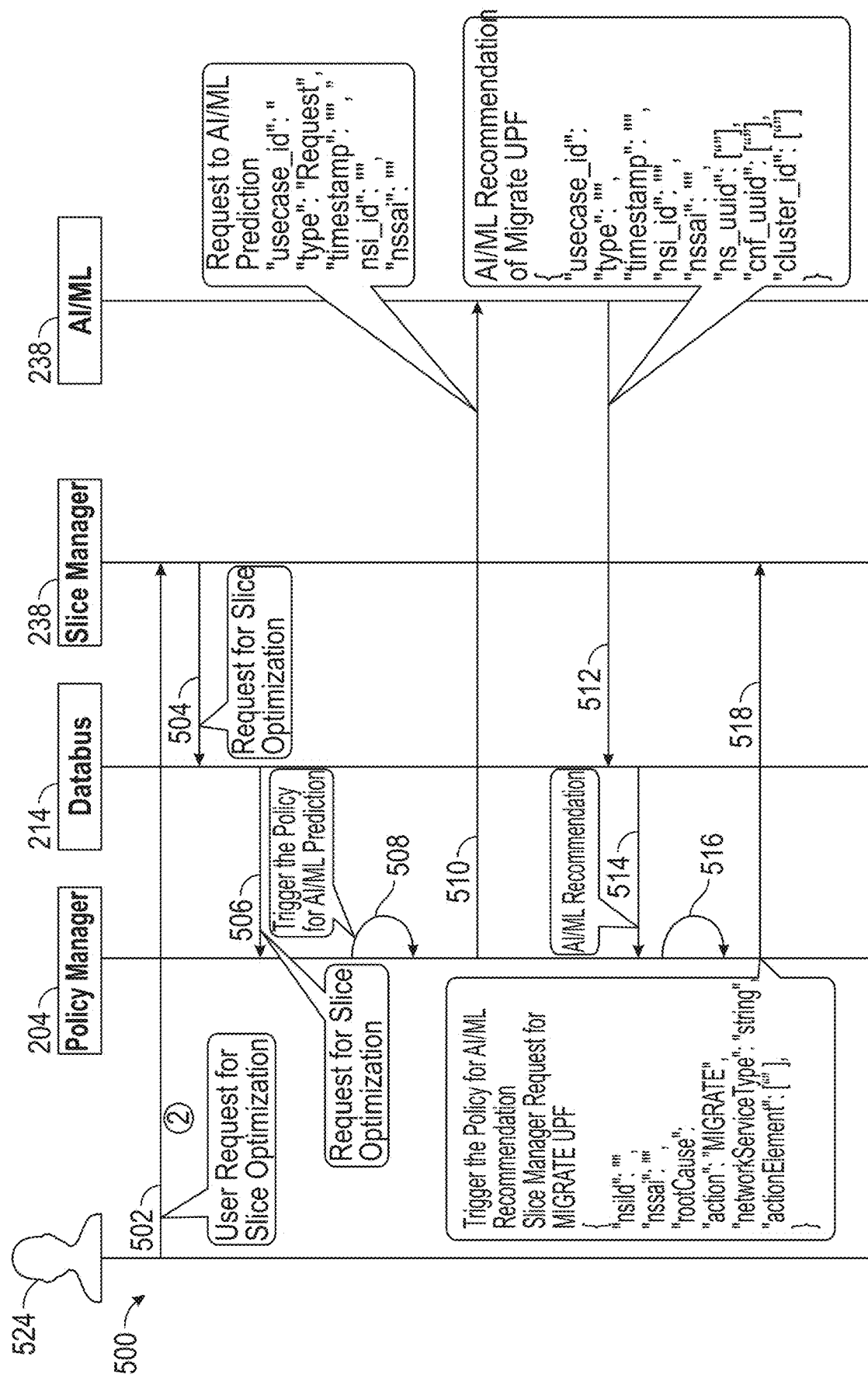
FIG. 5 is a data flow diagram of a method for datacenter resource optimization, in accordance with some embodiments.

FIG. 5 is a data flow diagram of a method for datacenter resource optimization 500, in accordance with some embodiments.

FIG. 5 is discussed to provide an understanding of the operation of CPEs 100 and 200 through method for datacenter resource optimization 500. In some embodiments, method for datacenter resource optimization 500 is a functional overview of a CPE, such as CPEs 100 and/or 200. In some embodiments, method for datacenter resource optimization 500 is executed by processing circuitry 602 discussed below with respect to FIG. 6. In some embodiments, some, or all the operations of method for datacenter resource optimization 500 are executed in accordance with instructions corresponding to instructions 606 discussed below with respect to FIG. 6.

Method for datacenter resource optimization 500 includes operations 502-518, but the operations are not necessarily performed in the order shown. Operations are added, replaced, order changed, and/or eliminated as appropriate, in accordance with the spirit and scope of the embodiments. In some embodiments, one or more of the operations of method for datacenter resource optimization 500 are repeated. In some embodiments, unless specifically stated otherwise, the operations of method for datacenter resource optimization 500 are performed in order.

At operation 502 of method for datacenter resource optimization 500, user 524 requests from a UI, such as UI 208 or UI 618, to optimize a slice from slice manger 238. Process flows from operation 502 to operation 504.

At operation 504 of method for datacenter resource optimization 500, slice manager 238 streams the user request through databus 214. Process flows from operation 504 to operation 506.

At operation 506 of method for datacenter resource optimization 500, policy manager 204 consumes the request to optimize the slice from slice manger 238 via databus 214. Process flows from operation 506 to operation 508.

At operation 508 of method for datacenter resource optimization 500, an existing active policy for slice optimization in policy manager 204 is triggered based on one or more incoming events. Process flows from operation 508 to operation 510.

At operation 510 of method for datacenter resource optimization 500, policy manager 204 triggers an AI/ML recommendation request to AI/ML application 236. Process flows from operation 510 to operation 512.

At operation 512 of method for datacenter resource optimization 500, AI/ML application 236 predicts a new threshold and streams the recommendation with MIGRATE UPF onto databus 214. Process flows from operation 512 to operation 514.

At operation 514 of method for datacenter resource optimization 500, the AI/ML recommendation is consumed by policy manager 204 from databus 214. Process flows from operation 514 to operation 516.

At operation 516 of method for datacenter resource optimization 500, a new active policy is created by policy manager 204 based on the AI/ML recommendation. Process flows from operation 516 to operation 518.

At operation 518 of method for datacenter resource optimization 500, in response to a triggering of the new active policy, policy manager 204 triggers slice manager 238 for a UPF MIGRATE operation to migrate the UPF from an existing datacenter to another datacenter.

FIG. 6 is a high-level functional block diagram of a processor-based system 600, in accordance with some embodiments. In some embodiments, system 600 is a general-purpose computing device including a hardware processing circuitry 602 and a non-transitory, computer-readable storage medium 604. Storage medium 604, amongst other things, is encoded with, i.e., stores, computer instructions 606, i.e., a set of executable instructions such as a AI recommended auto-assurance policy manager. Execution of instructions 606 by hardware processing circuitry 602 represents (at least in part) a tool which implements a portion or all the methods, such as methods 300, 400, and 500, described herein in accordance with one or more embodiments (hereinafter, the noted processes and/or methods).

Hardware processing circuitry 602 is electrically coupled to a computer-readable storage medium 604 via a bus 608. Hardware processing circuitry 602 is further electrically coupled to an I/O interface 610 by bus 608. A network interface 612 is further electrically connected to processing circuitry 602 via bus 608. Network interface 612 is connected to a network 614, so that processing circuitry 602 and computer-readable storage medium 604 connect to external elements via network 614. Processing circuitry 602 is configured to execute computer instructions 606 encoded in computer-readable storage medium 604 in order to cause system 600 to be usable for performing the noted processes and/or methods, such as methods 300, 400, and 500, of FIGS. 3, 4, and 5. In one or more embodiments, processing circuitry 602 is a central processing unit (CPU), a multi-processor, a distributed processing system, an application specific integrated circuit (ASIC), and/or a suitable processing unit.

In one or more embodiments, computer-readable storage medium 604 is an electronic, magnetic, optical, electromagnetic, infrared, and/or a semiconductor system (or apparatus or device). For example, computer-readable storage medium 604 includes a semiconductor or solid-state memory, a magnetic tape, a removable computer diskette, a random-access memory (RAM), a read-memory (ROM), a rigid magnetic disk, and/or an optical disk. In one or more embodiments using optical disks, computer-readable storage medium 604 includes a compact disk-read memory (CD-ROM), a compact disk-read/write (CD-R/W), and/or a digital video disc (DVD).

In one or more embodiments, storage medium 604 stores computer instructions 606 configured to cause system 600 to be usable for performing a portion or the noted processes and/or methods. In one or more embodiments, storage medium 604 further stores information, such as a AI recommended auto-assurance policy engine which facilitates performing the noted processes and/or methods.

System 600 includes I/O interface 610 that is like UI 208. I/O interface 610 is coupled to external circuitry. In one or more embodiments, I/O interface 610 includes a keyboard, keypad, mouse, trackball, trackpad, touchscreen, cursor direction keys and/or other suitable I/O interfaces are within the contemplated scope of the disclosure for communicating information and commands to processing circuitry 602.

System 600 further includes network interface 612 coupled to processing circuitry 602. Network interface 612 allows system 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-864. In one or more embodiments, noted processes and/or methods, are implemented in two or more system 600.

System 600 is configured to receive information through I/O interface 610. The information received through I/O interface 610 includes one or more of instructions, data, and/or other parameters for processing by processing circuitry 602. The information is transferred to processing circuitry 602 via bus 608. System 600 is configured to receive information related to a UI, such as UI 618, through I/O interface 610. The information is stored in computer-readable medium 604 as user interface (UI) 208.

In some embodiments, the noted processes and/or methods are implemented as a standalone software application for execution by processing circuity. In some embodiments, the noted processes and/or methods are implemented as a software application that is a part of an additional software application. In some embodiments, the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, a system, includes processing circuitry; and a memory connected to the processing circuitry, wherein the memory is configured to store executable instructions that, in response to being executed by the processing circuitry, facilitate performance of operations to receive, by a policy manager, one or more events from a databus; trigger, based on the one or more events, an existing assurance policy; trigger, based on the existing assurance policy, a prediction request to an artificial intelligence (AI)/(ML) machine learning application; receive, by the policy manager, a change recommendation from the AI/ML application; create, by the policy manager, a new assurance policy based on the change recommendation from the AI/ML application; and trigger, by the policy manager, a corrective action to be taken based on a triggering of the new assurance policy implementing the change recommendation.

In some embodiments, the executable instructions that, in response to being executed by the processing circuitry, further facilitate performance of operations to before the receiving the one or more events from the databus, receive performance monitor (PM) metrics from distributed units (DUs) at an observability framework (OBF) application; publish, by the OBF application, to the databus decoded PM metrics corresponding to a portion of the one or more events; and subscribe, by the policy manager, to the databus to receive the one or more events from the databus.

In some embodiments, the executable instructions that, in response to being executed by the processing circuitry, further facilitate performance of operations to in response to the triggering the existing assurance policy based on the one or more events, wherein the one or more events are the portion of the one or more events, determine, by the policy manager, a downlink throughput for each user equipment (UE) based on a guaranteed UE throughput volume over time; determine, by the policy manager and based on the portion of the one or more events, whether a UE downlink throughput has breached a low threshold determined by a guaranteed throughput or a high threshold determined by a maximum throughput; and in response to either the low threshold or the high threshold being breached, the triggering the prediction request to the AI/ML application.

In some embodiments, the triggering the corrective action to be taken based on the triggering of the new assurance policy implementing the change recommendation includes modify, by a slice manager based on a request from the policy manager, a physical resource block (PRB) of one or more enhanced mobile broadband (eMBB) slices.

In some embodiments, the executable instructions that, in response to being executed by the processing circuitry, further facilitate performance of operations to before the receiving the one or more events from the databus, receive N3 interface downlink PM metrics from user plane function (UPF) at an observability framework (OBF) application; enrich the N3 interface downlink PM metrics with data from a central inventory where the data corresponds to the N3 interface downlink PM metrics; and subscribe, by the policy manager, to the databus to receive the one or more events from the databus of which the enriched N3 interface downlink PM metrics are included.

In some embodiments, the executable instructions that, in response to being executed by the processing circuitry, further facilitate performance of operations to in response to the triggering the existing assurance policy based on the one or more events, where the one or more events are the enriched N3 interface downlink PM metrics, determine, by the policy manager, a slice utilization percentage; determine, by the policy manager and based on the enriched N3 interface downlink PM metrics, whether the slice utilization percentage has breached a scale-in threshold or a scale-out threshold; and in response to either the scale-in threshold or the scale-out threshold being breached, the triggering the prediction request to the AI/ML application.

In some embodiments, the executable instructions that, in response to being executed by the processing circuitry, further facilitate performance of operations to before the receiving the one or more events from the databus, receive a slice optimization request from a user interface (UI) at a slice manager; stream, by the slice manager, the slice optimization request to the databus; and receive, by the policy manager, the slice optimization request from the databus.

In some embodiments, the executable instructions that, in response to being executed by the processing circuitry, further facilitate performance of operations to in response to the triggering the existing assurance policy based on the one or more events, where the one or more events is the slice optimization request, the triggering the prediction request to the AI/ML application; recommend, by the AI/ML application, a migrate UPF action based on a slice optimization threshold received with the slice optimization request; and in response to the slice optimization threshold being breached, the triggering the corrective action to be taken based on the triggering of the new assurance policy implementing the change recommendation includes triggering the slice manager to perform a UPF migrate operation.

In some embodiments, a method executed by processing circuitry, includes receiving, by a policy manager, one or more events from a databus; triggering, based on the one or more events, an existing assurance policy; triggering, based on the existing assurance policy, a prediction request to an artificial intelligence (AI)/(ML) machine learning application; receiving, by the policy manager, a change recommendation from the AI/ML application; creating, by the policy manager, a new assurance policy based on the change recommendation from the AI/ML application; and triggering, by the policy manager, a corrective action to be taken based on a triggering of the new assurance policy implementing the change recommendation.

In some embodiments, the method further includes before the receiving the one or more events from the databus, receiving performance monitor (PM) metrics from distributed units (DUs) at an observability framework (OBF) application; publishing, by the OBF application, to the databus decoded PM metrics corresponding to a portion of the one or more events; and subscribing, by the policy manager, to the databus to receive the one or more events from the databus.

In some embodiments, the method further includes in response to the triggering the existing assurance policy based on the one or more events, wherein the one or more events are the portion of the one or more events, determining, by the policy manager, a downlink throughput for each user equipment (UE) based on a guaranteed UE throughput volume over time; determining, by the policy manager and based on the portion of the one or more events, whether a UE downlink throughput has breached a low threshold determined by a guaranteed throughput or a high threshold determined by a maximum throughput; and in response to either the low threshold or the high threshold being breached, the triggering the prediction request to the AI/ML application.

In some embodiments, the triggering the corrective action to be taken based on the triggering of the new assurance policy implementing the change recommendation includes modifying, by a slice manager based on a request from the policy manager, a physical resource block (PRB) of one or more enhanced mobile broadband (eMBB) slices.

In some embodiments, the method further includes before the receiving the one or more events from the databus, receiving N3 interface downlink PM metrics from user plane function (UPF) at an observability framework (OBF) application; enriching the N3 interface downlink PM metrics with data from a central inventory where the data corresponds to the N3 interface downlink PM metrics; and subscribing, by the policy manager, to the databus to receive the one or more events from the databus of which the enriched N3 interface downlink PM metrics are included.

In some embodiments, the method further includes in response to the triggering the existing assurance policy based on the one or more events, where the one or more events are the enriched N3 interface downlink PM metrics, determining, by the policy manager, a slice utilization percentage; determining, by the policy manager and based on the enriched N3 interface downlink PM metrics, whether the slice utilization percentage has breached a scale-in threshold or a scale-out threshold; and in response to either the scale-in threshold or the scale-out threshold being breached, the triggering the prediction request to the AI/ML application.

In some embodiments, the method further includes before the receiving the one or more events from the databus, receiving a slice optimization request from a user interface (UI) at a slice manager; streaming, by the slice manager, the slice optimization request to the databus; and receiving, by the policy manager, the slice optimization request from the databus.

In some embodiments, the method further includes in response to the triggering the existing assurance policy based on the one or more events, where the one or more events is the slice optimization request, the triggering the prediction request to the AI/ML application; recommending, by the AI/ML application, a migrate UPF action based on a slice optimization threshold received with the slice optimization request; and in response to either the slice optimization threshold being breached, the triggering the corrective action to be taken based on the triggering of the new assurance policy implementing the change recommendation includes triggering the slice manager to perform a UPF migrate operation.

In some embodiments, a non-transitory tangible computer readable storage medium storing a computer program, wherein the computer program contains instructions that in response to being executed, cause processing circuitry to perform operations to receive, by a policy manager, one or more events from a databus; trigger, based on the one or more events, an existing assurance policy; trigger, based on the existing assurance policy, a prediction request to an artificial intelligence (AI)/(ML) machine learning application; receive, by the policy manager, a change recommendation from the AI/ML application; create, by the policy manager, a new assurance policy based on the change recommendation from the AI/ML application; and trigger, by the policy manager, a corrective action to be taken based on a triggering of the new assurance policy implementing the change recommendation.

In some embodiments, the instructions that, in response to being executed by the processing circuitry, further facilitate performance of operations to before the receiving the one or more events from the databus, receive performance monitor (PM) metrics from distributed units (DUs) at an observability framework (OBF) application; publish, by the OBF application, to the databus decoded PM metrics corresponding to a portion of the one or more events; and subscribe, by the policy manager, to the databus to receive the one or more events from the databus.

In some embodiments, the instructions that, in response to being executed by the processing circuitry, further facilitate performance of operations to before the receiving the one or more events from the databus, receive N3 interface downlink PM metrics from user plane function (UPF) at an observability framework (OBF) application; enrich the N3 interface downlink PM metrics with data from a central inventory where the data corresponds to the N3 interface downlink PM metrics; and subscribe, by the policy manager, to the databus to receive the one or more events from the databus of which the enriched N3 interface downlink PM metrics are included.

In some embodiments, the instructions that, in response to being executed by the processing circuitry, further facilitate performance of operations to before the receiving the one or more events from the databus, receive a slice optimization request from a user interface (UI) at a slice manager; stream, by the slice manager, the slice optimization request to the databus; and receive, by the policy manager, the slice optimization request from the databus.

The foregoing outlines features of several embodiments so that those skilled in the art better understand the embodiments. Those skilled in the art appreciate that ready use of the embodiments as a basis for designing or modifying other processes and structures for carrying out the same purposes and/or achieving the same advantages of the embodiments introduced herein. Those skilled in the art further realize that such equivalent constructions do not depart from the spirit and scope of the embodiments, and that various changes, substitutions, and alterations do not depart from the spirit and scope of the embodiments.

What is claimed is:

1. A system, comprising:
processing circuitry; and
a memory connected to the processing circuitry, wherein the memory is configured to store executable instructions that, in response to being executed by the processing circuitry, facilitate performance of operations to:
   receive, by a policy manager, one or more events from a databus;
   trigger, based on the one or more events, an existing assurance policy;
   trigger, based on the existing assurance policy, a prediction request to an artificial intelligence (AI)/(ML) machine learning application;
   receive, by the policy manager, a change recommendation from the AI/ML application;
   create, by the policy manager, a new assurance policy based on the change recommendation from the AI/ML application; and
   trigger, by the policy manager, a corrective action to be taken based on a triggering of the new assurance policy implementing the change recommendation.

2. The system of claim 1, wherein the executable instructions that, in response to being executed by the processing circuitry, further facilitate performance of operations to:
   before the receiving the one or more events from the databus, receive performance monitor (PM) metrics from distributed units (DUs) at an observability framework (OBF) application;
   publish, by the OBF application, to the databus decoded PM metrics corresponding to a portion of the one or more events; and
   subscribe, by the policy manager, to the databus to receive the one or more events from the databus.

3. The system of claim 2, wherein the executable instructions that, in response to being executed by the processing circuitry, further facilitate performance of operations to:
   in response to the triggering the existing assurance policy based on the one or more events, wherein the one or more events are the portion of the one or more events, determine, by the policy manager, a downlink throughput for each user equipment (UE) based on a guaranteed UE throughput volume over time;

determine, by the policy manager and based on the portion of the one or more events, whether a UE downlink throughput has breached a low threshold determined by a guaranteed throughput or a high threshold determined by a maximum throughput; and in response to either the low threshold or the high threshold being breached, the triggering the prediction request to the AI/ML application.

4. The system of claim 3, wherein:

the triggering the corrective action to be taken based on the triggering of the new assurance policy implementing the change recommendation comprises:

modify, by a slice manager based on a request from the policy manager, a physical resource block (PRB) of one or more enhanced mobile broadband (eMBB) slices.

5. The system of claim 1, wherein the executable instructions that, in response to being executed by the processing circuitry, further facilitate performance of operations to:

before the receiving the one or more events from the databus, receive N3 interface downlink PM metrics from user plane function (UPF) at an observability framework (OBF) application;

enrich the N3 interface downlink PM metrics with data from a central inventory where the data corresponds to the N3 interface downlink PM metrics; and subscribe, by the policy manager, to the databus to receive the one or more events from the databus of which the enriched N3 interface downlink PM metrics are included.

6. The system of claim 5, wherein the executable instructions that, in response to being executed by the processing circuitry, further facilitate performance of operations to:

in response to the triggering the existing assurance policy based on the one or more events, where the one or more events are the enriched N3 interface downlink PM metrics, determine, by the policy manager, a slice utilization percentage;

determine, by the policy manager and based on the enriched N3 interface downlink PM metrics, whether the slice utilization percentage has breached a scale-in threshold or a scale-out threshold; and in response to either the scale-in threshold or the scale-out threshold being breached, the triggering the prediction request to the AI/ML application.

7. The system of claim 1, wherein the executable instructions that, in response to being executed by the processing circuitry, further facilitate performance of operations to:

before the receiving the one or more events from the databus, receive a slice optimization request from a user interface (UI) at a slice manager;

stream, by the slice manager, the slice optimization request to the databus; and receive, by the policy manager, the slice optimization request from the databus.

8. The system of claim 7, wherein the executable instructions that, in response to being executed by the processing circuitry, further facilitate performance of operations to:

in response to the triggering the existing assurance policy based on the one or more events, where the one or more events is the slice optimization request, the triggering the prediction request to the AI/ML application;

recommend, by the AI/ML application, a migrate UPF action based on a slice optimization threshold received with the slice optimization request; and in response to the slice optimization threshold being breached, the triggering the corrective action to be taken based on the triggering of the new assurance policy implementing the change recommendation includes triggering the slice manager to perform a UPF migrate operation.

9. A method executed by processing circuitry, comprising:

receiving, by a policy manager, one or more events from a databus;

triggering, based on the one or more events, an existing assurance policy;

triggering, based on the existing assurance policy, a prediction request to an artificial intelligence (AI)/ (ML) machine learning application;

receiving, by the policy manager, a change recommendation from the AI/ML application;

creating, by the policy manager, a new assurance policy based on the change recommendation from the AI/ML application; and triggering, by the policy manager, a corrective action to be taken based on a triggering of the new assurance policy implementing the change recommendation.

10. The method of claim 9, further comprising:

before the receiving the one or more events from the databus, receiving performance monitor (PM) metrics from distributed units (DUs) at an observability framework (OBF) application;

publishing, by the OBF application, to the databus decoded PM metrics corresponding to a portion of the one or more events; and subscribing, by the policy manager, to the databus to receive the one or more events from the databus.

11. The method of claim 10, further comprising:

in response to the triggering the existing assurance policy based on the one or more events, wherein the one or more events are the portion of the one or more events, determining, by the policy manager, a downlink throughput for each user equipment (UE) based on a guaranteed UE throughput volume over time;

determining, by the policy manager and based on the portion of the one or more events, whether a UE downlink throughput has breached a low threshold determined by a guaranteed throughput or a high threshold determined by a maximum throughput; and in response to either the low threshold or the high threshold being breached, the triggering the prediction request to the AI/ML application.

12. The method of claim 11, wherein:

the triggering the corrective action to be taken based on the triggering of the new assurance policy implementing the change recommendation comprises:

modifying, by a slice manager based on a request from the policy manager, a physical resource block (PRB) of one or more enhanced mobile broadband (eMBB) slices.

13. The method of claim 9, further comprising:

before the receiving the one or more events from the databus, receiving N3 interface downlink PM metrics from user plane function (UPF) at an observability framework (OBF) application;

enriching the N3 interface downlink PM metrics with data from a central inventory where the data corresponds to the N3 interface downlink PM metrics; and subscribing, by the policy manager, to the databus to receive the one or more events from the databus of which the enriched N3 interface downlink PM metrics are included.

14. The method of claim 13, further comprising:
in response to the triggering the existing assurance policy based on the one or more events, where the one or more events are the enriched N3 interface downlink PM metrics, determining, by the policy manager, a slice utilization percentage;
determining, by the policy manager and based on the enriched N3 interface downlink PM metrics, whether the slice utilization percentage has breached a scale-in threshold or a scale-out threshold; and
in response to either the scale-in threshold or the scale-out threshold being breached, the triggering the prediction request to the AI/ML application.

15. The method of claim 9, further comprising:
before the receiving the one or more events from the databus, receiving a slice optimization request from a user interface (UI) at a slice manager;
streaming, by the slice manager, the slice optimization request to the databus; and
receiving, by the policy manager, the slice optimization request from the databus.

16. The method of claim 15, further comprising:
in response to the triggering the existing assurance policy based on the one or more events, where the one or more events is the slice optimization request, the triggering the prediction request to the AI/ML application;
recommending, by the AI/ML application, a migrate UPF action based on a slice optimization threshold received with the slice optimization request; and
in response to either the slice optimization threshold being breached, the triggering the corrective action to be taken based on the triggering of the new assurance policy implementing the change recommendation includes triggering the slice manager to perform a UPF migrate operation.

17. A non-transitory tangible computer readable storage medium storing a computer program, wherein the computer program contains instructions that in response to being executed, cause processing circuitry to perform operations to:
receive, by a policy manager, one or more events from a databus;
trigger, based on the one or more events, an existing assurance policy;
trigger, based on the existing assurance policy, a prediction request to an artificial intelligence (AI)/(ML) machine learning application;
receive, by the policy manager, a change recommendation from the AI/ML application;
create, by the policy manager, a new assurance policy based on the change recommendation from the AI/ML application; and
trigger, by the policy manager, a corrective action to be taken based on a triggering of the new assurance policy implementing the change recommendation.

18. The non-transitory tangible computer readable storage medium of claim 17, wherein the instructions that, in response to being executed by the processing circuitry, further facilitate performance of operations to:
before the receiving the one or more events from the databus, receive performance monitor (PM) metrics from distributed units (DUs) at an observability framework (OBF) application;
publish, by the OBF application, to the databus decoded PM metrics corresponding to a portion of the one or more events; and
subscribe, by the policy manager, to the databus to receive the one or more events from the databus.

19. The non-transitory tangible computer readable storage medium of claim 17, wherein the instructions that, in response to being executed by the processing circuitry, further facilitate performance of operations to:
before the receiving the one or more events from the databus, receive N3 interface downlink PM metrics from user plane function (UPF) at an observability framework (OBF) application;
enrich the N3 interface downlink PM metrics with data from a central inventory where the data corresponds to the N3 interface downlink PM metrics; and
subscribe, by the policy manager, to the databus to receive the one or more events from the databus of which the enriched N3 interface downlink PM metrics are included.

20. The non-transitory tangible computer readable storage medium of claim 17, wherein the instructions that, in response to being executed by the processing circuitry, further facilitate performance of operations to:
before the receiving the one or more events from the databus, receive a slice optimization request from a user interface (UI) at a slice manager;
stream, by the slice manager, the slice optimization request to the databus; and
receive, by the policy manager, the slice optimization request from the databus.

* * * * *